Patented Sept. 27, 1938

2,131,089

UNITED STATES PATENT OFFICE 2,131,089

ACTIVATING AND MAINTAINING THE ACTIVITY OF DEHYDROGENATION CATALYSTS

Otto Beeck, Berkeley, James Burgin, Oakland, and Herbert P. A. Groll, Berkeley, Calif., assignors to Shell Development Company, San Francisco, Calif., a corporation of Delaware No Drawing. Application December 9, 1935, Serial No. 53,612

9 Claims. (Cl. 260—683)

This invention relates to a process for activating and maintaining the catalytic activity of dehydrogenation catalysts at a practical optimum value while employing such catalysts under such conditions that the catalytic dehydrogenation of organic compounds, particularly aliphatic and cycloaliphatic hydrocarbons, contacted therewith occurs at a practical rate resulting in the formation of the corresponding more unsaturated compounds containing the same number of carbon atoms to the molecule.

The process of the invention comprises contacting the material to be dehydrogenated with the catalyst under practical dehydrogenating conditions while intermittently or continuously adding to the reaction mixture a controlled critical amount of water vapor, alone, or together with, or alternately with a controlled amount of a material selected from the group consisting of hydrogen sulphide, hydrogen selenide and hydrogen telluride, whereby the dehydrogenation is effected continuously while the activity of the catalyst is substantially maintained at a practical optimum value over relatively long periods of time.

Numerous material advantages are inherent in our novel process. We may practically employ the relatively inexpensive metal and non-metal catalysts and catalyst mixtures which have hitherto been considered unsuitable due to their low initial activity and/or their rapid loss of activity on continued use. The fact that we may in accordance with our process employ materials, the use of which is impractical in the known processes due to their low initial activity and short life, is of great technical importance. The known methods of dehydrogenating aliphatic hydrocarbons to olefines, for example, generally require the use of the very active catalysts, as finely divided nickel, to obtain the required conversion per single pass over the catalysts. Such very active catalysts are generally relatively short lived and, in addition, their use requires the employment of low temperatures and impractical space velocities if substantial cracking is to be avoided. In accordance with the present process, we may employ in a practical and efficient manner the less reactive catalyst materials under conditions at which they possess their optimum practical activity, and we may by the means herein described substantially maintain the activity of said catalysts at a practical optimum, while effecting dehydrogenation at practical space velocities and temperatures at which the equilibrium allows the attainment of favorable conversions while cracking is substantially obviated. Further, in accordance with our process, any selected dehydrogenation catalyst may be more economically employed, for the catalytic material can be kept in continuous use for relatively much longer periods of time before it becomes necessary to terminate the process to replace, reform or reactivate the spent or partially spent catalyst. Thus, operating costs are materially decreased in that costly catalyst preparation, reformation and reactivation steps essential to most of the known methods need be resorted to less often, and in some cases they may be dispensed with entirely. Other important advantages of the invention will be apparent as the description proceeds.

Although we do not desire to be bound by any definite theory, our invention is readily explainable if it is assumed that dehydrogenation catalysts function at their maximum catalytic activity when their active surface is substantially completely covered by a mono-molecular layer of water. Thus, the process of the invention consists in selecting a catalytic material and employing said material under conditions at which such a mono-molecular layer can be maintained on its surface. Under most dehydrogenating conditions it is necessary to maintain said mono-molecular layer by adding a certain controlled amount of water vapor to the reaction mixture during the dehydrogenation. The critical amount of water to be added will be dependent upon the particular catalytic material and upon the conditions of its employment. If the reaction is started with the catalyst at its maximum activity sufficient water must be added to the reaction mixture as required to maintain that activity, that is, to maintain the mono-molecular layer of water. If insufficient water vapor is added, part of the catalyst surface loses its activating layer and there is a corresponding loss in catalytic activity. If more than the critical amount of water is added, a polymolecular layer of water forms on the catalyst surface and there is a loss in activity.

The above explanation is supported by results obtained in the dehydrogenation of isobutane to isobutylene by contacting it with an activated alumina catalyst at a temperature of about 600° C., space velocity of about 198 and atmospheric pressure. The term "space velocity" as used herein is the number of units of the gaseous material, measured at 0° C. and 76 cm. of mercury, contacted with a unit volume of catalyst per hour. The average conversion to isobutylene for 4 hours of continuous operation was only about 22.2% when the influent isobutane contained less than about 0.0001% by volume of water. When the water content was increased to about 0.09% by volume of the added isobutane, the average conversion over 4 hours was about 36.2%. When the water content of the isobutane was increased to about 0.6% by volume, the average conversion for about 4 hours was only 7.95%. It appears that under the operating conditions described, a mono-molecular layer of water is maintained on the surface of the alumina catalyst, and that said catalyst accordingly possesses its optimum activity under said conditions, when water vapor is added to the reaction mixture, during the dehydrogenation, in a controlled amount equal to from about 0.03% to about 0.2% by volume of the influent isobutane.

The quantity of the water added to the reaction mixture to maintain the catalyst activity at the practical optimum value will be dependent upon the particular catalytic material, the particular catalytic surface, and upon the conditions of temperature, pressure and space velocity at which said material is used. For every catalytic material and catalyst surface, and for every condition under which said material functions as a dehydrogenation catalyst, there is a definite critical concentration of water vapor which must be maintained in the reaction mixture in contact with the catalyst in order to maintain a mono-molecular layer of water on the surface thereof and thus maintain the catalytic material at its maximum dehydrogenating activity. This critical concentration can be determined by the operator for each selected catalytic material under the conditions at which it is desired to employ said material.

In some cases, the catalyst may be more readily maintained at its practical optimum value by adding to the reaction mixture, during the dehydrogenation, in addition to a controlled critical amount of water, a controlled critical amount of a gaseous sulphur, selenium or tellurium hydride or a mixture of such hydrides. Due to its availability and less offensive properties, hydrogen sulphide is preferably employed. The controlled amount of hydrogen sulphide may be added together with the controlled amount of water, or the controlled amounts of the different materials may be added alternately. The water and hydrogen sulphide, or equivalent material, appear to have a conjunctive influence whereby the catalyst is maintained at its optimum practical activity more readily. We have found that some catalysts appear to be activated by the formation on their surface of a mono-molecular layer of substances such as hydrogen sulphide, hydrogen selenide and hydrogen telluride alone. Accordingly, with some catalysts under some conditions, the catalytic activity can be maintained at a practical optimum by adding to the reaction mixture a controlled amount of one of these materials alone. When such a material, for example, hydrogen sulphide, is added to the reaction mixture during the dehydrogenation, said material is added in minimum amounts necessary to maintain the activity of the catalyst. Higher concentrations of hydrogen sulphide than are actually needed to maintain the catalyst activity are avoided due to the destructive effect of high concentrations of hydrogen sulphide on the metal walls of the catalyst tube or chamber.

In many cases, it may be desirable to subject the catalytic materials, prior to their use, to a pretreatment with water, hydrogen sulphide, hydrogen selenide, hydrogen telluride or a mixture of such compounds, or compounds yielding such substances under the conditions of the pretreatment. In general the pretreatment is effected at elevated temperatures, preferably at temperatures in the range of from about 200° C. to about 800° C., depending upon the stability and other characteristics of the catalytic material treated. The pretreatment generally requires from about 15 minutes to about 120 minutes or longer depending upon the temperature employed. In most cases with the non-metallic catalysts and hydrogen sulphide the pretreatment is effected at a temperature of about 600° C. for from about 30 minutes to 60 minutes. The pretreatment may be effected under reduced, ordinary or elevated pressures. If desired, the pretreatment may be effected at the same time that the catalyst is reactivated, but generally the catalyst is subjected to a pretreatment with water or with water and hydrogen sulphide following the reactivation treatment. In the use of an activated alumina catalyst, for example, to dehydrogenate a paraffin hydrocarbon, excellent results may be attained by subjecting the catalyst to a pretreatment with hydrogen sulphide at about 600° C. and then using the pretreated catalyst in the manner herein described, and maintaining its activity during the dehydrogenation by adding a controlled amount of water vapor to the reaction mixture. The pretreatment with hydrogen sulphide increases the catalytic activity. When the catalyst is pretreated with water, poly-molecular layers of water may be formed on the surface of the catalyst, and said catalyst will not possess its maximum activity until sufficient water is removed therefrom to leave substantially only a mono-molecular layer. When the catalyst is functioning at its maximum activity, a controlled amount of water is added to maintain the catalytic activity at a practical optimum. In some cases, a catalytic material substantially devoid of catalytic activity can be made sufficiently active to be practically usable in accordance with the invention by subjecting it to the pretreatment above described.

In accordance with the invention, metal sulphides may be advantageously used as dehydrogenation catalysts. We may initially employ a metal catalytic material, pretreat said metal with hydrogen sulphide and then employ the pretreated catalyst under dehydrogenation conditions while maintaining its activity at a practical optimum for a long period of time by adding a controlled amount of hydrogen sulphide or hydrogen sulphide and water to the reaction mixture. We may, on the other hand, start with a metal sulphide per se, and preferably pretreat the metal sulphide, and then maintain its catalytic activity at a practical optimum by adding to the reaction mixture during the dehydrogenation a controlled amount of water vapor, a controlled amount of hydrogen sulphide or a controlled amount of water and hydrogen sulphide together.

The process of the present invention is applicable in general to the dehydrogenation of organic compounds and it is a particular object of the invention to provide a practical and economical method for the technical scale conversion of the saturated aliphatic and cyclo-aliphatic hydrocarbons, such as are contained in or derived from petroleum and petroleum products, to the commercially valuable olefines. Saturated aliphatic compounds of straight chain or cyclic structure may be converted to the corresponding unsaturated compounds possessing one or a pluality of olefinic linkages, or unsaturated aliphatic hydrocarbons may be dehydrogenated to still more unsaturated compounds. For example, α-butylene may be dehydrogenated to butadiene, cyclohexene and cyclohexadiene may be dehydrogenated to benzene, tetrahydronaphthalene may be converted to naphthalene, etc.

The invention is applicable with excellent results to the conversion of paraffin hydrocarbons containing two or more carbon atoms to the molecule to the corresponding olefines of the same number of carbon atoms. For example, the corresponding olefines may be prepared from the hydrocarbons as ethane, propane, normal butane, isobutane, the straight and branched chain pentanes, cyclopentane, cyclohexane, the straight and branched chain hexanes, the heptanes, the octanes, the nonanes and the like and their homologues.

The compounds to be dehydrogenated may be treated severally or mixtures of said compounds may be treated. If desired, the dehydrogenation may be effected in the presence of relatively inert materials as stable hydrocarbons, stable olefines, hydrogen, nitrogen and the like. The inert material may act as a diluent and, in addition, advantageously affect the reaction and increase the conversion by decreasing the partial pressure of the treated material in the reaction mixture.

The catalysts which may be used in the process and their activity maintained at a practical optimum value in accordance therewith are, among others, the following:

The metals as nickel, iron, cobalt, chromium, titanium, manganese, zirconium, cerium, thorium, gold, silver, zinc, copper, platinum, palladium, irridium, osmium, rhodium and the like are, in general, suitable catalysts. Compound metal catalysts comprising a plurality of metals in admixture or alloyed are in many cases advantageously employed. Such alloys or mixtures comprising, for example, silver and copper, copper and chromium, copper and zinc, nickel and aluminum, nickel and zinc, nickel and cobalt, etc., or all of these as well as other metals or other metal combinations may be used. Any one or a plurality of metal dehydrogenation catalysts may be used in admixture or deposited upon non-metallic catalytic materials or inert or relatively inert materials. For example, the metal or metals may be incorporated with or deposited on the surface of a substantially inert material or carrier as pumice, clay, diatomaceous earth, kieselguhr and the like, or the metal or metals may be used in admixture or deposited on more or less active materials as the metal oxides, sulphides, carbonates, etc., charcoal, activated alumina, magnesite, silica, silica gel, thoria, ceria and the like. In many cases, the activity of the catalysts or catalyst mixtures may be enhanced by incorporating therewith small quantities of other substances capable of acting as promoters.

A wide variety of non-metallic substances and mixtures thereof are suitable for use as dehydrogenation catalysts in the execution of our invention. A suitable group includes among others the compounds, which are active as dehydrogenation catalysts or which can be made to function as dehydrogenation catalysts and which are sufficiently stable under conditions of their employment, of the metals as nickel, cobalt, platinum, vanadium, chromium, molybdenum, manganese, magnesium, niobium, tungsten, zinc, tantalum, aluminum, uranium and the like. Particularly suitable compounds of these metals are the oxides, sulphides, carbonates, chromates, chromites, molybdates, tungstates, uranates, manganates, manganites, sulpho-molybdates, sulpho-tungstates and the like. A particularly suitable group of non-metallic catalytic materials includes activated charcoal, activated alumina, silica gel, magnesite, zinc oxide, chromium oxide, thorium oxide, alumina impregnated with chromium oxide, alumina impregnated with chromium chromite, magnesite impregnated with chromium chromite, silica gel impregnated with chromium oxide and a catalyst comprising chromium oxide deposited on pumice. The catalysts may be used severally or in admixture with each other or inert materials.

The catalytic material in any suitable solid form, as powder, granules, pellets, etc., or deposited on an inert carrier or in admixture with an inert material, is employed in manners customary in catalytic processes of this type. The desired quantity of the catalytic material may be packed into a suitable reaction chamber of appropriate size and material and heated to and maintained at the desired operating temperature while the material to be treated is passed into contact with it, preferably in the vapor phase, at the desired space velocity and under the desired pressure of operation.

Activated alumina is a preferably employed catalyst. In the dehydrogenation of saturated paraffin hydrocarbons to the corresponding olefines using an activated alumina catalyst which may or may not be pretreated with a sulphur, selenium or tellurium hydride, and maintaining the activity of the catalyst at an optimum in accordance with the invention, the vapors of the paraffin hydrocarbon are preferably contacted with the catalyst maintained at a temperature of from about 500° C. to about 800° C.

The following examples illustrate modes of executing our invention. It is to be understood that the invention is not to be regarded as limited to materials treated, the catalysts used nor the modes of operation described in these examples.

*Example I*

The dehydrogenation of isobutane was effected by passing the vapors of isobutane through a silica reaction tube packed with an activated alumina catalyst. The alumina was employed in the form of about 8–14 mesh granules. The catalyst was heated to and maintained at a temperature of about 575° C. while the isobutane vapor was passed through it at a space velocity of about 164.4.

A controlled amount of water vapor was added to the influent isobutane. When said influent isobutane contained about 0.03% by volume of water, the maximum conversion to isobutylene of about 33.4% was obtained on one passage of the isobutane through the reaction tube. This higher conversion could be maintained substantially constant over long periods of operation simply by controlling the amount of water added so as to maintain the water content of the isobutane at about 0.03% by volume.

Without terminating the run, the water vapor content of the influent isobutane was increased to about 3% by volume. The conversion of isobutane to isobutylene decreased rapidly until a conversion of only about 8% was attained.

The amount of water added was decreased until the influent isobutane again contained only about 0.03% water vapor whereupon the activity of the catalyst was restored to the extent that a conversion of about 33% was obtained.

When the run was started using isobutane containing about 3% by volume of water vapor, the maximum attainable conversion was only about 6%.

This example illustrates the dependence of the activity of the catalyst upon the water vapor content of the reaction mixture and it illustrates how, in accordance with the invention, the activity of the catalyst can be maintained at a practical optimum value by adding a controlled critical amount of water vapor to the reaction mixture.

Example II

Isobutane was dehydrogenated by passing its vapor through an iron reaction vessel packed with granules of an activated alumina catalyst. The catalyst was pretreated by passing hydrogen sulphide through the tube heated to a temperature of from about 500° C. to about 600° C. for about 30 minutes. Following the pretreatment, isobutane vapors were passed at a space velocity of about 210 over the catalyst maintained at a temperature of about 600° C. It was found that the activity of the catalyst was dependent upon the water vapor content of the reaction mixture.

A maximum conversion to isobutylene of about 42% could be maintained substantially constant when sufficient water was added to maintain the water vapor content of the influent isobutane at from about 0.03% to about 0.09% by volume. When the water vapor content of the isobutane was increased to from about 0.3% to about 0.4% by volume, the conversion dropped to about 25%. When sufficient water was added to increase the water vapor content of the isobutane to from about 0.6% to 0.8% by volume, the maximum conversion was only about 15%.

This example shows the dependence of the catalyst activity upon the amount of water vapor present in the reaction and it shows that relatively higher conversions are obtained by subjecting the catalyst to a pretreatment with hydrogen sulphide. The higher conversions at optimum water vapor concentrations are probably due to a conjunctive influence of water vapor and hydrogen sulphide.

Substantially the same beneficial effect can be obtained by eliminating the pretreatment and while maintaining the water vapor content of the isobutane at from about 0.03% to about 0.2% by volume adding continuously or intermittently sufficient hydrogen sulphide to maintain its concentration at about 5% by volume or greater.

Example III

The activated alumina catalyst as used in the foregoing examples for the dehydrogenation of aliphatic hydrocarbons loses its activity after being in use for relatively long periods of time due to the deposition of carbon on the surface thereof. The catalyst may be reactivated by treating it with air or a mixture of air and steam at a temperature of from about 600° C. to about 800° C., whereby the deposited carbon is removed by oxidation to carbon dioxide. If the reactivation treatment is conducted at temperatures greater than about 800° C., the resulting activated catalyst is relatively less active due to the fact that it has lost a part of the rigidly bound water which is essential to its catalytic activity.

A series of runs were made as in the previous examples where the activity of the catalyst was maintained at an optimum by adding a controlled amount of water vapor. After 10 dehydrogenation-catalyst regeneration cycles, the regeneration treatment being effected at a temperature not greater than 800 C. and the catalyst being pretreated with hydrogen sulphide at about 600° C. prior to its use, an average conversion of from about 36% to about 40% could still be maintained.

In another run, the catalyst was regenerated by burning the deposited carbon to carbon dioxide at a temperature of about 950° C. With this catalyst, the maximum conversion was only about 12%; however, the initial activity of the catalyst was substantially restored by treating it with isobutane containing about 7% by volume of water under dehydrogenating conditions for about 30 minutes. The optimum activity was then maintained by maintaining the water vapor content of the influent isobutane at from about 0.03% to about 0.2% by volume.

Example IV

Isobutane was dehydrogenated to isobutylene using an activated alumina catalyst in the manner described in Example I. The gaseous isobutane was passed at a space velocity of about 198 over the catalyst maintained at a temperature of about 600° C. The water vapor content of the influent gas was controlled to a definite value throughout both the dehydrogenation reaction and the catalyst regeneration treatment with air.

When the isobutane prior to its introduction into the reaction chamber was dried by contact with phosphorus pentoxide, it was observed that after only a few cycles of dehydrogenation and catalyst regeneration the activity of the regenerated catalyst was decreased to the extent that it only converted about 15% to 18% of the isobutane to isobutylene on one passage through the reaction tube, as compared to the 30% to 34% conversions obtained with a fresh catalyst under the same conditions. This loss of activity of the catalyst was prevented by adding, during the dehydrogenation, a controlled amount of water vapor to the influent isobutane so that its water vapor content was maintained at about 0.2% by volume. Under these controlled conditions, the catalyst was used through ten cycles of dehydrogenation and catalyst regeneration with no apparent loss of catalyst activity.

Example V

Gaseous isobutane was carefully dried by contact with phosphorus pentoxide and passed over an activated alumina catalyst under the conditions described in Example I. The maximum conversion was only about 20%. This conversion can be increased to 25% by pretreating the catalyst with hydrogen sulphide, the pretreatment being effected by passing a stream of hydrogen sulphide over the catalyst heated to a temperature of about 600° C. for about 30 minutes.

Example VI

Isobutane was dehydrogenated to isobutylene by passing its vapors through a reaction tube packed with granules of an activated charcoal catalyst. The catalyst was maintained at a temperature of about 600° C. while isobutane vapors were passed over it at a space velocity of about 198. When the influent isobutane contained not more than about 0.2% by volume of water vapor, the maximum conversion was only about 21%.

Increasing the water vapor content of the isobutane to about 10% by volume increased the conversion to 25%.

Pretreatment of the charcoal catalyst with hydrogen sulphide at about 600° C. for about 30 minutes increased the conversion to about 27.5%.

*Example VII*

Isobutane was dehydrogenated to isobutylene by passing it in the vapor phase through a reaction tube packed with a commercial zinc oxide catalyst. The isobutane vapors were passed at a space velocity of about 180 over the catalyst maintained at a temperature of about 600° C. When the water vapor content of the influent isobutane was maintained below about 3% by volume, an average conversion to isobutylene of 15% was obtained. When sufficient water was added to increase the water vapor content of the isobutane to at least 3% by volume, the conversion decreased to 9.1%.

By pretreating the zinc oxide with hydrogen sulphide at about 600° C. for about one hour and maintaining less than 3% of water vapor in the influent isobutane, a conversion of 29.1% was attained. This conversion was decreased to 20.9% when the influent isobutane contained more than 3% by volume of water vapor.

This example illustrates the advantage of pretreating the catalyst with hydrogen sulphide and further illustrates the favorable conjunctive influence of the hydrogen sulphide and the controlled amount of water vapor on the activity of the catalyst.

*Example VIII*

Aliphatic hydrocarbons were dehydrogenated by contacting them in the vapor phase with a zinc oxide catalyst prepared by the decomposition of zinc oxalate. Isobutane was dehydrogenated by passing its vapors at a space velocity of about 198 over the catalyst heated to a temperature of about 600° C.

When the isobutane vapors contained about 0.2% by volume of water vapor, the conversion to isobutylene was about 9%. Increasing the water vapor content to 3% by volume increased the conversion to 12%.

With the same catalyst pretreated with hydrogen sulphide at about 600° C. for about 1 hour, the conversion to isobutylene was 23.3% when the isobutane contained 0.2% water vapor and 26.4% when the water vapor content was increased to 3%.

*Example IX*

Hydrocarbons were dehydrogenated by contacting them with a compound aluminum oxide-chromium oxide catalyst. The catalytic material in the form of about 8 to 14 mesh granules was packed in a reaction tube and the hydrocarbon vapors passed through the heated reaction tube.

Isobutane was dehydrogenated to isobutylene by passing its vapors at a space velocity of about 600 over the catalyst maintained at a temperature of about 600° C. When the influent isobutane was substantially devoid of water, the conversion to isobutylene was about 20%. Adding sufficient water to the influent isobutane to maintain its water content at about 3% by volume, increased the conversion to about 22%.

When the catalyst was pretreated with hydrogen sulphide at a temperature of about 600° C. for about 30 minutes and substantially dry isobutane was treated, the optimum conversion was about 30%. Increasing the water vapor content of the isobutane to about 3% by volume, increased the conversion to about 39%. When the water vapor content of the isobutane was increased to 10%, the maximum conversion was only 27%.

*Example X*

When isobutane vapors were passed over granules of pumice packed in a reaction tube and heated to and maintained at a temperature of about 600° C., the maximum conversion to isobutylene was only about 4%.

The same catalyst was subjected to a pretreatment with hydrogen sulphide. After the pretreatment, the acitvity of the pumice was increased to the extent that conversions of about 8% were obtainable.

*Example XI*

Isobutane was dehydrogenated to isobutylene by contacting it in the vapor phase with a catalyst comprising silica gel impregnated with chromium oxide. The isobutane vapors were passed over the catalyst at a space velocity of about 600, the catalyst being maintained at a temperature of about 600° C.

When the treated isobutane was substantially anhydrous, the maximum conversion to isobutylene was about 14%. When a controlled amount of water vapor was added to the influent isobutane so that its water vapor content was maintained at about 3% by volume, the conversion was increased to about 23%.

*Example XII*

Crude magnesite ($MgCO_3$) was impregnated with chromic acid and used as a dehydrogenation catalyst. The catalyst in the form of granules was packed in a reaction tube and heated to a temperature of about 600° C. while isobutane in the vapor phase was passed through the packed tube at a space velocity of about 600. Under these conditions, only about 6% of the isobutane was converted to isobutylene per single passage through the reaction tube.

When the same catalytic material was pretreated with hydrogen sulphide for about 30 minutes at a temperature of about 600° C., a conversion of about 29% was obtained under substantially the same conditions.

*Example XIII*

Isobutane was dehygrogenated to isobutylene by contacting it in the vapor phase with a nickel metal catalyst supported on unglazed porcelain. The catalyst was prepared by impregnating unglazed porcelain chips with nickel nitrate, and subsequently calcining the nickel nitrate to nickel oxide in a nitrogen atmosphere and reducing the nickel oxide to nickel metal by treatment with hydrogen at about 400° C.

Isobutane vapor was passed over the catalytic material at a temperature of about 600° C. and a space velocity of about 198. About 30% of the applied isobutane was decomposed to carbon and hydrogen, and the addition of water vapor failed to reduce the extent of decomposition.

The same catalytic material was pretreated with hydrogen sulphide at a temperature of from about 200° C. to about 800° C. Isobutane vapors, substantially free of sulphur compounds, were passed over the pretreated catalyst at a space velocity of about 200 and a temperature of about 600° C. The conversion to isobutylene was about 25%. After about 60 minutes of continuous operation, the conversion had decreased to 9%.

The same pretreated catalyst was used under the conditions above described but about 10% by volume of hydrogen sulphide was added to the influent isobutane. A conversion to isobutylene of about 25.4% was obtained and maintained for a long period of continuous operation.

A nickel sulphide catalyst was prepared by precipitating nickel sulphide with hydrogen sulphide. The precipitated nickel sulphide was washed, dried, broken to granules of substantially uniform size and pretreated with hydrogen sulphide at a temperature of about 600° C. The pretreated catalyst was maintained at a temperature of about 600° C. while substantially sulphur-free isobutane vapors were passed over it at a space velocity of about 200. The initial conversion to isobutylene was about 29.5%. After about 30 minutes of continuous operation, the conversion decreased to about 10%. When from about 1% to about 15% by volume of hydrogen sulphide was added to the influent isobutane, the practical conversion of about 29.5% was again attained and this conversion could be maintained over long periods of time as long as the hydrogen sulphide was continuously added in controlled amounts. The concentration of about 1% by volume is about the minimum amount which will activate and maintain the activity. Concentrations of hydrogen sulphide exceeding about 15% by volume are to be avoided due to their destructive influence on the material of the catalyst chamber under operating conditions.

Example XIV

A quartz reaction tube having an inside diameter of about 1 cm. and a heating length of about 50 cms. was packed with about 8–14 mesh granules of an activated alumina catalyst. The catalyst was maintained at a temperature of about 600° C. while substantially anhydrous cyclohexane was fed into the reaction tube at a rate of about 1 c. c. of liquid per minute. About 30% of the cyclohexane passed through the reaction tube was dehydrogenated to benzene.

When sufficient water was added to the influent cyclohexane to maintain about 0.04% by volume of water vapor in the cyclohexane vapors, the conversion was increased to and maintained at about 60%. When the water vapor content of the influent cyclohexane vapors was increased to about 1% by volume, the conversion decreased to about 40%.

When the alumina catalyst was pretreated with hydrogen sulphide and used under the conditions above described while the concentration of water vapor in the influent cyclohexane vapors was maintained at about 0.04% by volume, a conversion of about 75% of the treated cyclohexane to benzene was maintained over a long period of time.

In view of the above examples, the invention is not to be considered as in any way limited to the dehydrogenation of the compounds specifically disclosed therein, namely, isobutane and cyclohexane. The same is broadly applicable to hydrocarbons in general and particularly to aliphatic and cycloaliphatic hydrocarbons of which isobutane and cyclohexane are, respectively, representative. Isobutane was used as representative of the aliphatic hydrocarbons for purposes of convenience of comparison, since when this hydrocarbon is treated it is easy to see whether operating conditions are such that dehydrogenation is effected while cracking is substantially obviated.

The term "aliphatic hydrocarbon" as used in the appended claims is intended to include the hydrocarbons of aliphatic character whether they be of straight chain, branched chain or cyclic character.

While we have described our invention in a detailed manner and provided specific examples illustrating suitable modes of executing the same, it is to be understood that modifications may be made and that no limitations other than those imposed by the scope of the appended claims are intended.

We claim as our invention:

1. A process for the catalytic dehydrogenation of an aliphatic hydrocarbon containing at least two carbon atoms predominantly to the corresponding unsaturated compound possessing fewer hydrogen atoms but the same number of carbon atoms which comprises subjecting a dehydrogenation catalyst substantially free of uncombined metal to an activation treatment with a gaseous hydride selected from the group consisting of the hydrides of sulphur, selenium and tellurium at an elevated temperature, subsequently contacting the aliphatic hydrocarbon with the pretreated catalyst under dehydrogenation conditions at which scission of the hydrocarbon molecule is substantially obviated, and substantially maintaining the activity of the catalyst at a practical optimum during the dehydrogenation by adding to the reaction mixture a controlled amount of water vapor in such proportions that a monomolecular layer of water is maintained on the catalyst surface.

2. A process for the catalytic dehydrogenation of an aliphatic hydrocarbon containing at least two carbon atoms predominantly to the corresponding unsaturated compound possessing fewer hydrogen atoms but the same number of carbon atoms which comprises subjecting a dehydrogenation catalyst substantially free of uncombined metal to an activation treatment with hydrogen sulphide at an elevated temperature, subsequently contacting the aliphatic hydrocarbon with the pretreated catalyst under dehydrogenation conditions at which scission of the hydrocarbon molecule is substantially obviated, and substantially maintaining the activity of the catalyst at a practical optimum during the dehydrogenation by adding to the reaction mixture a controlled amount of water vapor in such proportions that a monomolecular layer of water is maintained on the catalyst surface.

3. A process for the catalytic dehydrogenation of an aliphatic hydrocarbon containing at least two carbon atoms predominantly to the corresponding unsaturated compound possessing fewer hydrogen atoms but the same number of carbon atoms which comprises contacting the aliphatic hydrocarbon with a dehydrogenation catalyst substantially free of uncombined metal under dehydrogenation conditions at which scission of the hydrocarbon molecule is substantially obviated, and substantially maintaining the activity of the catalyst at a practical optimum during the dehydrogenation by adding to the reaction mixture a controlled amount of water vapor in such proportions that a monomolecular layer of water is maintained on the catalyst surface.

4. A process for the catalytic dehydrogenation of an aliphatic hydrocarbon containing at least two carbon atoms predominantly to the corresponding unsaturated compound possessing fewer hydrogen atoms but the same number of carbon atoms which comprises contacting the vapors of the aliphatic hydrocarbon with a dehydrogenation catalyst substantially free of uncombined metal under dehydrogenation conditions at which scission of the hydrocarbon molecule is substantially obviated, and substantially maintaining the activity of the catalyst at a practical optimum during the dehydrogenation by adding to the reaction mixture a controlled amount of water vapor and a controlled amount of hydrogen sulphide in such proportions that a monomolecular layer of water is maintained on the catalyst surface.

5. A process for the catalytic dehydrogenation of an aliphatic hydrocarbon containing at least two carbon atoms to the molecule predominantly to the corresponding unsaturated compound containing fewer hydrogen atoms but the same number of carbon atoms which comprises the steps of treating a dehydrogenation catalyst substantially free of uncombined metal with hydrogen sulphide at a temperature of from about 200° C. to about 800° C., contacting the aliphatic hydrocarbon with the pretreated catalyst under dehydrogenation conditions at which scission of the hydrocarbon molecule is substantially obviated, and substantially maintaining the activity of the catalyst at a practical optimum value during the dehydrogenation by adding to the reaction mixture a controlled amount of water vapor in such proportions that a monomolecular layer of water is maintained on the catalyst surface.

6. A process for the catalytic dehydrogenation of an aliphatic hydrocarbon containing at least two carbon atoms to the molecule predominantly to the corresponding unsaturated compound containing fewer hydrogen atoms but the same number of carbon atoms which comprises contacting the vapors of the aliphatic hydrocarbon with a catalyst essentially consisting of an activated alumina such as "activated alumina" at a temperature of from about 500° C. to about 800° C. whereby scission of the hydrocarbon molecule is substantially obviated, and maintaining the activity of the catalyst at a practical optimum during the dehydrogenation by adding to the reaction mixture a controlled amount of water vapor in such proportions that a monomolecular layer of water is maintained on the catalyst surface.

7. A process for the catalytic dehydrogenation of an aliphatic hydrocarbon containing at least two carbon atoms to the molecule predominantly to the corresponding unsaturated hydrocarbon containing fewer hydrogen atoms but the same number of carbon atoms which comprises subjecting a catalyst essentially consisting of an activated alumina such as "activated alumina" to an activation treatment with hydrogen sulphide at an elevated temperature, subsequently contacting the vapors of the aliphatic hydrocarbon with the pretreated catalyst at a temperature of from about 500° C. to about 800° C. whereby scission of the hydrocarbon molecule is substantially obviated, and substantially maintaining the activity of the catalyst at a practical optimum by maintaining a water vapor content of from about 0.03% to about 0.2% by volume in the material contacted with the catalyst.

8. A process for the catalytic dehydrogenation of an aliphatic hydrocarbon containing at least two carbon atoms to the molecule predominantly to the corresponding unsaturated compound containing fewer hydrogen atoms but the same number of carbon atoms which comprises subjecting an activated charcoal catalyst to a pretreatment with hydrogen sulphide at an elevated temperature, subsequently contacting the vapors of the aliphatic hydrocarbon with the pretreated catalyst at a temperature of from about 500° C. to about 800° C. whereby scission of the hydrocarbon molecule is substantially obviated, and substantially maintaining the activity of the catalyst at a practical optimum during the dehydrogenation by adding to the reaction mixture a controlled amount of water vapor in such proportions that a monomolecular layer of water is maintained on the catalyst surface.

9. A process for the catalytic dehydrogenation of isobutane to isobutylene which comprises subjecting a catalyst essentially consisting of an activated alumina such as "activated alumina" to an activation treatment by contacting it with hydrogen sulphide at a temperature of about 600° C., subsequently contacting isobutane in the vapor phase with the pretreated catalyst at a temperature of from 500° C. to 800° C. whereby scission of the hydrocarbon molecule is substantially obviated, and maintaining the activity of the catalyst at a practical optimum during the dehydrogenation by maintaining a water vapor content of from about 0.03% to about 0.2% by volume in the treated isobutane vapors.

OTTO BEECK.
JAMES BURGIN.
HERBERT P. A. GROLL.